US010628223B2

(12) United States Patent
Purnaprajna et al.

(10) Patent No.: US 10,628,223 B2
(45) Date of Patent: Apr. 21, 2020

(54) OPTIMIZED ALLOCATION OF TASKS IN HETEROGENEOUS COMPUTING SYSTEMS

(71) Applicant: AMRITA VISHWA VIDYAPEETHAM, Bangalore, Karnataka (IN)

(72) Inventors: Madhura Purnaprajna, Bengaluru (IN); Vanishree Kattishetti, Bengaluru (IN)

(73) Assignee: AMRITA VISHWA VIDYAPEETHAM, Bangalore (IN)

( * ) Notice: Subject to any disclaimer, the term of this patent is extended or adjusted under 35 U.S.C. 154(b) by 0 days.

(21) Appl. No.: 16/108,647

(22) Filed: Aug. 22, 2018

(65) Prior Publication Data

US 2019/0065271 A1  Feb. 28, 2019

(30) Foreign Application Priority Data

Aug. 22, 2017 (IN) .............................. 201741029762

(51) Int. Cl.
*G06F 9/46* (2006.01)
*G06F 9/50* (2006.01)
*G06F 8/41* (2018.01)
*G06F 9/48* (2006.01)
*G06F 9/455* (2018.01)

(52) U.S. Cl.
CPC .............. *G06F 9/5038* (2013.01); *G06F 8/41* (2013.01); *G06F 9/455* (2013.01); *G06F 9/4881* (2013.01); *G06F 9/505* (2013.01); *G06F 9/5044* (2013.01); *G06F 9/5077* (2013.01)

(58) Field of Classification Search
CPC ........................................................ G06F 9/52
USPC ........................................................ 718/104
See application file for complete search history.

(56) References Cited

U.S. PATENT DOCUMENTS 8,316,380 B2 * 11/2012 Keil ....................... G06Q 10/10
                                                   719/313
8,375,392 B2 *  2/2013 Becchi .................. G06F 9/5044
                                                   718/102
8,418,187 B2 *  4/2013 Greenhalgh .......... G06F 1/3293
                                                   718/105
8,589,935 B2 * 11/2013 Prasanna ............... G06F 9/5072
                                                   718/104

(Continued)

*Primary Examiner* — Mehran Kamran
(74) *Attorney, Agent, or Firm* — Convergence Intellectual Property Law P.C.; Jonathan Garfinkel

(57) ABSTRACT

A method and system for automatically optimizing task allocation in heterogeneous computing systems is disclosed. The system comprises a plurality of target processing elements and a host processor. The host processor is configured to receive one or more requests from one or more applications for task allocation. During compilation, a virtualizer extracts parameters of kernels of the one or more applications and receives the architectures of the plurality of target processing elements. The virtualizer comprises a device conformability module and a mapping module. The device conformability module provides a prediction on execution time of the kernels for each of the architectures based on the parameters. The mapping module compares the predictions and indicates a ranking of the plurality of target processing elements based on least execution time for each of the kernels and determines a combination of the plurality of target processing elements based on the mapping prediction to optimize the task allocation.

11 Claims, 4 Drawing Sheets

(56) References Cited

U.S. PATENT DOCUMENTS

| | | | | |
|---|---|---|---|---|
| 8,683,468 | B2* | 3/2014 | Breternitz | G06F 9/5066 |
| | | | | 718/100 |
| 8,904,398 | B2* | 12/2014 | Chung | G06F 9/5066 |
| | | | | 709/226 |
| 8,984,519 | B2* | 3/2015 | Cadambi | G06F 9/505 |
| | | | | 718/103 |
| 9,367,357 | B2* | 6/2016 | Cadambi | G06F 9/5044 |
| 9,405,585 | B2* | 8/2016 | Chess | G06F 9/505 |
| 9,529,620 | B1* | 12/2016 | Dow | G06F 9/455 |
| 2010/0156888 | A1* | 6/2010 | Luk | G06T 1/20 |
| | | | | 345/418 |
| 2011/0066828 | A1* | 3/2011 | Wolfe | G06F 9/5044 |
| | | | | 712/220 |
| 2012/0079235 | A1* | 3/2012 | Iyer | G06F 9/5027 |
| | | | | 712/30 |
| 2012/0254879 | A1* | 10/2012 | Chung | G06F 9/5066 |
| | | | | 718/102 |
| 2013/0160016 | A1* | 6/2013 | Gummaraju | G06F 9/5044 |
| | | | | 718/102 |
| 2013/0185705 | A1* | 7/2013 | Kuesel | G06F 8/443 |
| | | | | 717/152 |
| 2014/0215035 | A1* | 7/2014 | Anderson | H04L 67/10 |
| | | | | 709/223 |
| 2015/0040136 | A1* | 2/2015 | Matthes | G06F 9/5094 |
| | | | | 718/104 |
| 2015/0370588 | A1* | 12/2015 | Ashok | G06F 9/45558 |
| | | | | 718/1 |
| 2017/0255877 | A1* | 9/2017 | Cho | G06N 20/00 |
| 2019/0019267 | A1* | 1/2019 | Suresh | G06F 9/5044 |

* cited by examiner

OPTIMIZED ALLOCATION OF TASKS IN HETEROGENEOUS COMPUTING SYSTEMS

CROSS-REFERENCES TO RELATED APPLICATIONS

The present application claims priority to Indian Patent Application No. 201741029762, filed on Aug. 22, 2017, which is incorporated herein by reference in its entirety.

FIELD OF THE INVENTION

The invention generally relates to heterogeneous computing systems, and in particular to systems, methods, and devices for optimized task allocation in heterogeneous computing systems.

DESCRIPTION OF RELATED ART

Present disclosure generally relates to heterogeneous computing systems. Heterogeneous computing systems (HCS) include several processing devices or accelerators, which have diverse micro-architectures and different programming platforms. These devices work collaboratively on different tasks of an application, especially processor intensive and data parallel tasks, in order to achieve higher system performance overall.

However, this diversity is accompanied by a serious challenge of selecting suitable micro-architectures for different tasks of any given application. This challenge gets aggravated with the diverse programming platforms that each device is associated with. For instance, GPU applications are written in languages like CUDA and OpenCL. Applications written for the FPGA are in Hardware Description Languages like Verilog, VHDL, and System Verilog.

One approach to overcome these challenges, as known in the art, includes the use of a unified programming framework, such as OpenCL. However, even with this framework, the programmer bears an additional overhead of specifying the workload assignment. For instance, the job of determining the appropriate device for different portions of the application code is left to the programmer who may be unaware of the architecture level details of the devices.

Various publications have attempted to provide optimized workload assignment. For example, U.S. Pat. No. 8,418,187B2 discloses virtualization software migrating workload between processing circuitries while making architectural states available transparent to operating system. U.S. Pat. No. 8,375,392B2 discloses data aware scheduling on heterogeneous platforms. U.S. Pat. No. 8,683,468B2 discloses automatic kernel migration for heterogeneous cores. U.S. Pat. No. 9,529,620B1 discloses transparent virtual machine offloading in a heterogeneous processor. However, there exists no automated tool that provides an optimized work/task assignment by dynamically distributing the task among the processing devices.

SUMMARY OF THE INVENTION

The present subject matter, in general, relates to, heterogeneous computing system, and in particular, to optimized allocation of tasks in heterogeneous computing systems.

The above-mentioned problems are solved and overcome by automatically optimizing task allocation in heterogeneous computing systems (HCS).

The present subject matter relates to systems and methods to automatically optimize allocation of tasks in heterogeneous computing systems. The system includes a plurality of target processing elements, a virtualizer, and a host processor. Each of the plurality of target processing elements may have a distinct architecture and may include processors with a known instruction set architecture or with a compiler available. The virtualizer is configured to receive one or more requests from one or more applications for the allocation of tasks. The virtualizer is further configured to extract parameters of kernels of the one or more applications. Further, the virtualizer receives the architectures of the plurality of target processing elements.

The virtualizer may include a device conformability module to provide predictions on execution time of the kernels of the one or more applications for each of the architectures based on the parameters. The virtualizer further comprises a mapping module to compare the predictions to derive a mapping prediction. The mapping prediction indicates a ranking of the plurality of target processing elements based on least execution time for each of the kernels and determines a combination of the plurality of target processing elements based on the mapping prediction. The tasks are allocated to the combination of the plurality of target processing elements and, therefore, an optimized and automated task allocation is provided.

In one embodiment, the system further comprises a compiler to transform a source code of a portion of the one or more applications to machine code based on the mapping prediction.

In one embodiment, the mapping prediction indicates a list of target processing elements based on an increasing order of the execution time for each kernel.

In one embodiment, the plurality of target processing elements execute the portion of the one or more applications.

In one embodiment, the plurality of target processing elements comprises at least one of Central Processing Unit (CPU), Graphics Processing Unit (GPU), Field-Programmable Gate Array (FPGA).

In one embodiment, the host processor is configured to execute the virtualizer.

In one embodiment, the plurality of target processing elements have distinct architectures.

In another embodiment, the present subject matter relates to a method to automatically optimize task allocation in Heterogeneous Computing Systems (HCS). The method includes receiving, by a virtualizer, one or more requests from one or more applications for task allocation to a plurality of target processing elements. The virtualizer extracts parameters of kernels of the one or more applications and receives architectures of the plurality of target processing elements. Predictions on execution time of the kernels for each of the plurality of target processing elements are determined based on the parameters and the architectures. The predictions are compared to derive a mapping prediction, which indicates a ranking of the plurality of target processing elements based on least execution time for each of the kernels. Further, combinations of the plurality of target processing elements are determined based on the mapping prediction. The virtualizer allocates the tasks to the combination of the plurality of target processing elements to provide optimized task allocation.

In one embodiment, the task comprises executing at least a portion of the one or more applications.

In one embodiment, the method includes determining a workload distribution ratio among the plurality of target processing elements.

In one embodiment, the mapping prediction ranks the plurality of target processing elements based on the workload distribution ratio.

In one embodiment, the mapping prediction indicates ranking of the plurality of target processing elements based on least execution time for each of the kernels and the workload distribution ratio among the plurality of target processing elements.

In one embodiment, the method includes compiling a source code of the portion of the one or more applications to machine code based on the mapping prediction.

In one embodiment, the mapping prediction is modified based on runtime performance of the portion of the one or more applications during runtime.

In various embodiments, a computer program product having non-volatile memory therein, carrying computer executable instructions stored therein for automatically optimizing task allocation in heterogeneous computing systems is provided. The instructions include receiving one or more requests from one or more applications for task allocation to a plurality of target processing elements. The instructions then include extracting parameters of kernels of the one or more applications and receiving architectures of the plurality of target processing elements. Subsequently, the instructions include predicting execution time of the kernels for each of the plurality of target processing elements based on the parameters and the architectures. The instructions further include comparing the predictions to derive a mapping prediction, which indicates a ranking of the plurality of target processing elements based on least execution time for each of the kernels. Further, combinations of the plurality of target processing elements are determined based on the mapping prediction. Finally, the instructions include allocating the tasks to the combination of the plurality of target processing elements to provide optimized task allocation.

This and other aspects are disclosed herein.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE EMBODIMENTS

Figure 1:
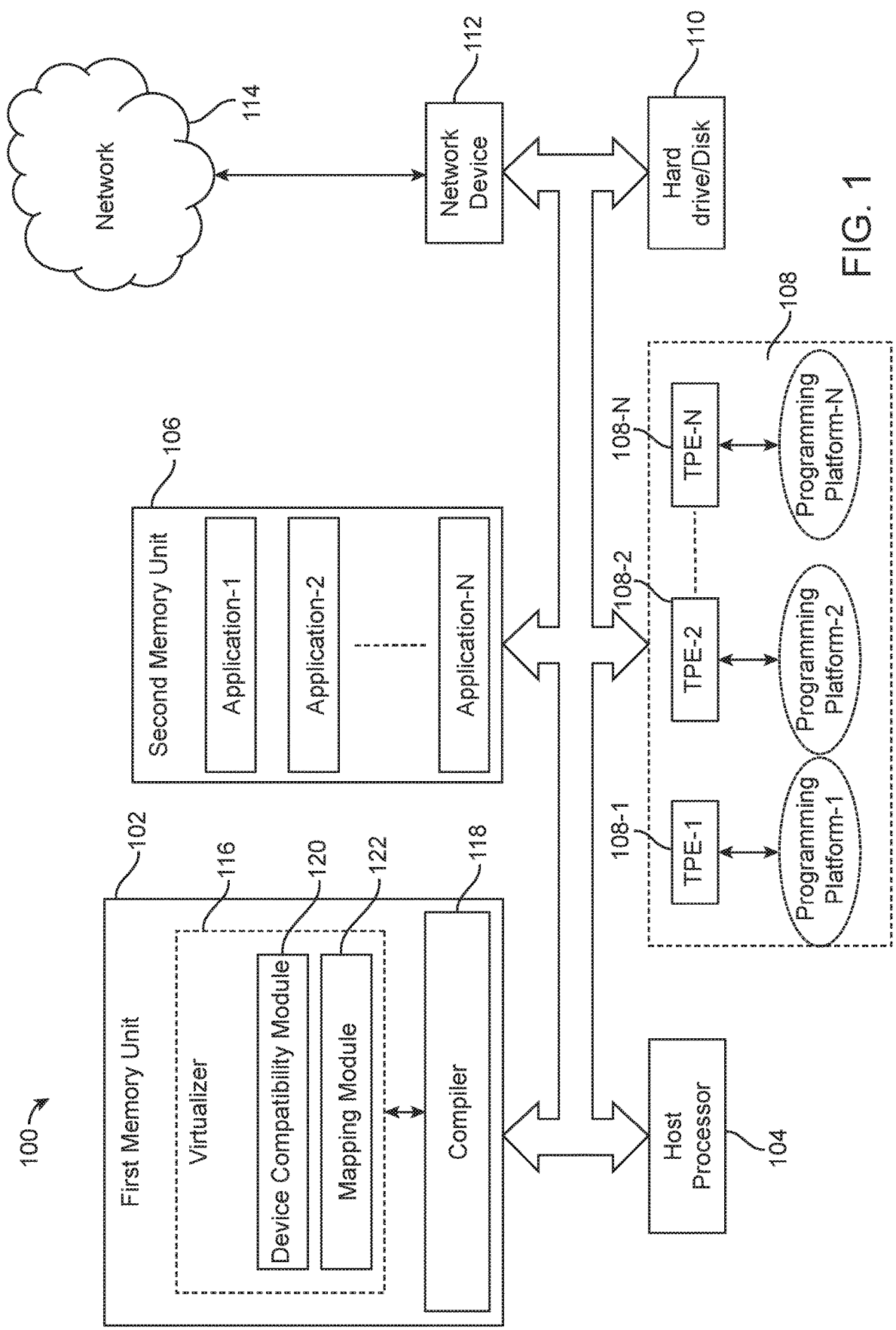
FIG. 1 illustrates a schematic diagram of the system for optimizing allocation of tasks, according to one embodiment of the present subject matter.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The present subject matter relates to a system and a method to automatically optimize task allocation in heterogeneous computing systems. The system includes a plurality of target processing elements, a virtualizer, and a host processor. The virtualizer is configured to extract parameters of kernels of one or more applications. It also receives information of the architectures of the plurality of target processing elements. The virtualizer comprises a device conformability module and a mapping module. The device conformability module provides predictions on performances of the kernels for each of the architectures based on the parameters. Based on these parameters, the mapping module compares the predictions and selects one or more of the plurality of target processing elements for the task allocation.

A schematic representation of a system 100 for optimizing task allocation in Heterogeneous Computing Systems (HCS) is illustrated in FIG. 1. The system 100 includes a first memory unit 102, a host processor 104, a second memory unit 106, a plurality of target processing elements 108-1, 108-2 . . . , 108-N, hard disk or hard drive 110. The first memory unit 102 may include a virtualizer 116 and a compiler 118. The second memory unit 106 may store a plurality of applications to be executed by the system. In various embodiments, the first memory unit may be permanent storage and the second memory unit may be a temporary storage. In some embodiments, a network device 112 to connect to a network 114 is provided.

The virtualizer 116 may be configured to extract parameters of kernels of the one or more applications and receive the architectures of the plurality of target processing elements 108-1, 108-2, . . . , 108-N. In various embodiments, the virtualizer 106 may include a device conformability module 120 and a mapping module 122 as will be discussed later. The compiler 118 may be target-specific compiler for compiling a source code to machine code.

In various embodiments, the plurality of target processing elements 108-1, 108-2 . . . , 108-N may include several distinct processors in combination with a central processor for providing specialized processing capabilities. For instance, the plurality of target processing elements 108-1, 108-2, . . . , 108-N may include a Central Processing Unit (CPU), a Graphical Processing Unit (GPU), a Field-Programmable Gate Array (FPGA), etc. As shown, the target processing elements may be configured to operate in diverse programming platforms. The platforms may provide different environments in which software is executed. Further, the host processor 104 is configured to receive one or more requests from one or more applications for task allocation. In one embodiment, the task may include executing a portion of the one or more applications. For example, the host processor 104 may receive requests for executing a program from a gaming application, which may be installed on the system, to render images related to a game. In one embodiment, the host processor 104 may be configured to execute the virtualizer 116.

The device conformability module 120 and the mapping module 122 of the virtualizer 116, according to various embodiments, may be implemented as one or more software modules, hardware modules, firmware modules, or some combination of these. Generally, the functionality of these modules may be combined or distributed as desired in the various embodiments. The program modules may include routines, programs, objects, components, data structures, and the like, that perform particular tasks or implement particular abstract data types.

The device conformability module 120 predicts performances of the kernels for each of the architectures based on the parameters of the kernels of the one or more applications. For example, the performance may be characterized by execution time, i.e., time taken for executing a program by processor. The parameters may include at least one of compute to communication ratio, synchronization, parallelism, etc. In one embodiment, the plurality of target processing elements 108-1, 108-2 . . . , 108-N may have distinct architectures and may be configured on different programming platforms, such as Verilog, VHSIC Hardware Description Language (VHDL), and System Verilog.

The mapping module 122 compares the predictions made by the device conformability module 120 and derives a mapping prediction. The mapping prediction indicates a ranking of the plurality of target processing elements 108-1, 108-2, . . . , 108-N based on least execution time for each of the kernels. In one embodiment, the mapping prediction may indicate a ranking of the plurality of target processing elements based on the workload distribution ratio among the plurality of target processing elements. Based on the mapping prediction, a combination of the plurality of target processing elements 108-1, 108-2 . . . , 108-N are determined. The virtualizer 116 allocates the tasks to the combination of the plurality of target processing elements 108-1, 108-2 . . . , 108-N to provide optimized task allocation.

In one example, the mapping prediction may specify one of the plurality of target processing elements 108-1, 108-2 . . . , 108-N to be selected for the task allocation. For instance, the mapping module 122 may indicate an appropriate target processor based on least execution time, architecture compatibility, etc. For example, the mapping module 122 may select the GPU for executing the program of the gaming application to render images related to the game, based on architectural compatibility.

Further, the system 100 includes a target-specific compiler 118 for compiling a source code of the portion of the one or more applications to machine code based on the mapping prediction. In one embodiment, the compiler 118 may construct one source file for each of the target processing elements and carry out device dependent optimization for the target processing elements according to the mapping prediction. These per-device compiled versions are executed on the corresponding target processing elements. In one embodiment, the performance of the executions may be measured during runtime for feedback. Based on this feedback, the mapping may be altered dynamically for improved performance of the system 100.

In various embodiments, the system 100 is connected to a plurality of client devices or server systems (not shown in figure) running the applications over a network. In some embodiments, the applications may be downloaded and stored in the second memory unit 106. The virtualizer may be configured to receive parameters of the kernels of the applications from the client devices. The virtualizer 116 may be configured to allocate tasks related with the applications to the one or more target processing elements 108-N.

Figure 2:
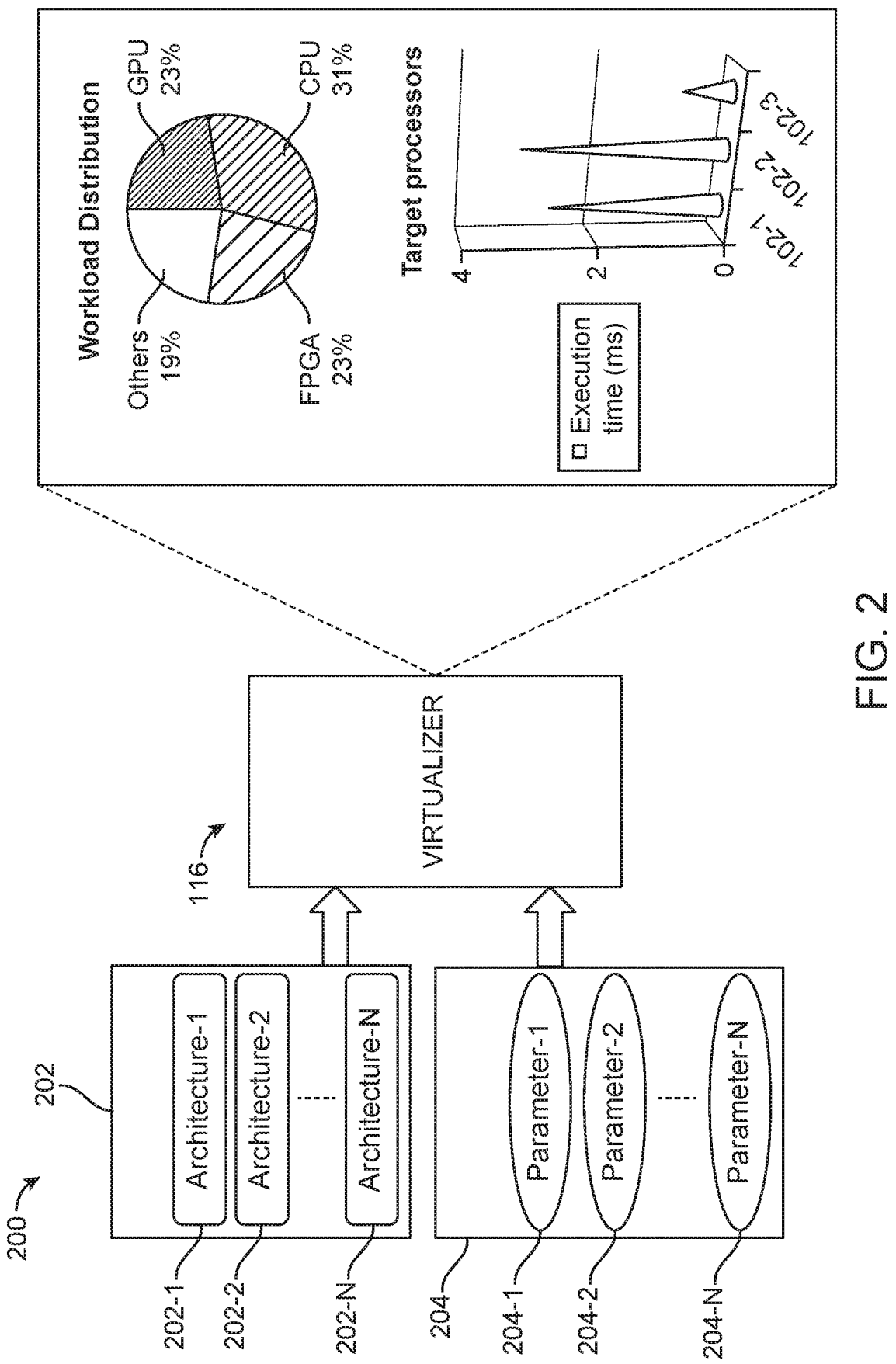
FIG. 2 illustrates a model of the virtualizer for task allocation, according to one embodiment of the present subject matter.

An example of the model of the virtualizer 116 is illustrated in FIG. 2, according to an embodiment. The virtualizer 116 may be a combination of software, firmware, or hardware. In one embodiment, the virtualizer 116 may communicate between the application and a target-specific compiler to facilitate task allocation dynamically. In another embodiment, virtualizer 116 may include software that allows application programs written in first native instruction set to be executed on a hardware platform adopting a second native instruction set.

The virtualizer 116 receives the architecture information 202-1, 202-2 . . . , 202-N of the plurality of target processing elements 102-1, 102-2 . . . , 102-N. Further, the virtualizer receives a set of parameters 204-1, 204-2, . . . , 204-N of kernels of the one or more applications. It extracts kernel or task parameters of the application, such as compute-to-communication ratio, parallelism, sychronization. Based on the architectures 202-1, 202-2 . . . , 202-N and the parameters, the virtualizer may predict the execution time for each target processor. Additionally, the virtualizer may also determine the workload distribution ratio based on the relative predicted execution time on each of the target processing elements. The execution time may further be used for deriving mapping prediction as described earlier and in subsequent sections.

Figure 3:
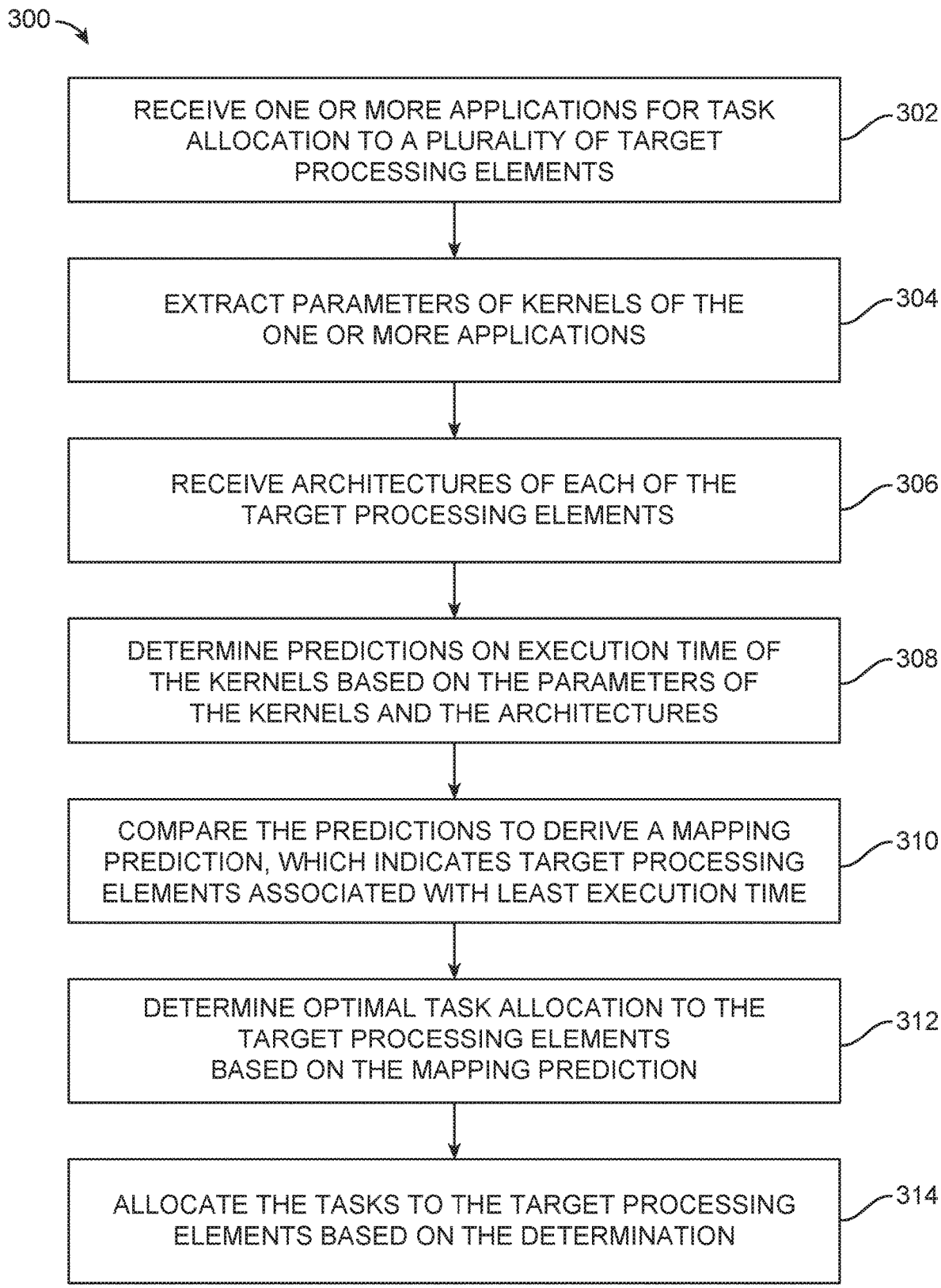
FIG. 3 illustrates a method to automatically optimize task allocation in heterogeneous computing systems, according to one embodiment of the present subject matter.

A method 300 for automatically optimizing task allocation in the HCS 100 is illustrated in FIG. 3, according to an embodiment of the present subject matter. The method 300 may be performed by the virtualizer 116. The method 300 may include receiving one or more applications requests for the task allocation on one of a plurality of target processing elements 108-1, 108-2 . . . , 108-N, at block 302. In one embodiment, the task may include executing at least a portion of the one or more applications.

The parameters of kernels of the one or more applications and architectures of the plurality of target processing elements 108-1, 108-2 . . . , 108-N are extracted, at block 304 and block 306. Based on the parameters of the kernels of the one or more applications and the architectures, predictions on execution time of the kernels for each of the architectures are determined, at block 308. In one embodiment, the predictions are determined by calculating the execution time of the kernels for each of the architectures.

These predictions are compared to derive the mapping prediction, at block 310. The mapping prediction may be used for indicating one of the plurality of target processing elements 108-1, 108-2 . . . , 108-N for the task allocation. In one embodiment, the mapping prediction may indicate a list of target processing elements 108-1, 108-2 . . . , 108-N ranked based on their execution time. For example, the target processing element associated with least execution time may be ranked highest, i.e., as highest priority.

In one embodiment, the mapping prediction ranks the plurality of target processing elements based on which the workload distribution ratio is determined among the plurality of target processing elements. Based on the mapping prediction, a combination of the plurality of target processing elements 108-1, 108-2 . . . , 108-N are determined, at block 312. The virtualizer 116 allocates the tasks to the combination of the plurality of target processing elements 108-1, 108-2 . . . , 108-N to provide optimized task allocation, at block 314.

Further, a source code of the portion of the one or more applications is compiled to machine code. The one or more target processor 108-1, 108-2 . . . , 108-N executes the portion of the application using the machine code. In one embodiment, the mapping prediction may be modified based on the performance of the portion of the one or more applications during runtime.

In one implementation, the virtualizer 116 may function in two phases, the initial phase with CPU and GPU, and the next phase with CPU, GPU, and FPGA. For instance, in the initial phase, the virtualizer may determine relative performance of CPU and GPU instead of the absolute performance. With the relative performance estimation, the virtualizer 116 may determine an automatic optimal task/data distribution ratio between CPU and GPU for data parallel applications.

The virtualizer 116 may determine the relative performance through static code analysis/off-line profiling information. The analysis may be performed based on this off-line profile information and target elements architecture specification, such as number of cores/threads, instructions executed per cycle, frequency of operation available at compile time. The slowest path in the CPU and GPU code may be identified based on the analysis. Further, the execution time may be estimated in each case to find the suitability of an application to each device, based on the device information and the slowest path/profile information of each code. Once the choice of the element is made (i.e. the relative estimated execution time on either element is estimated), the virtualizer 116 determines an optimal data distribution ratio automatically based on the relative performance.

EXAMPLE

Example 1: Computational Efficiency on Benchmarks

Figure 4:
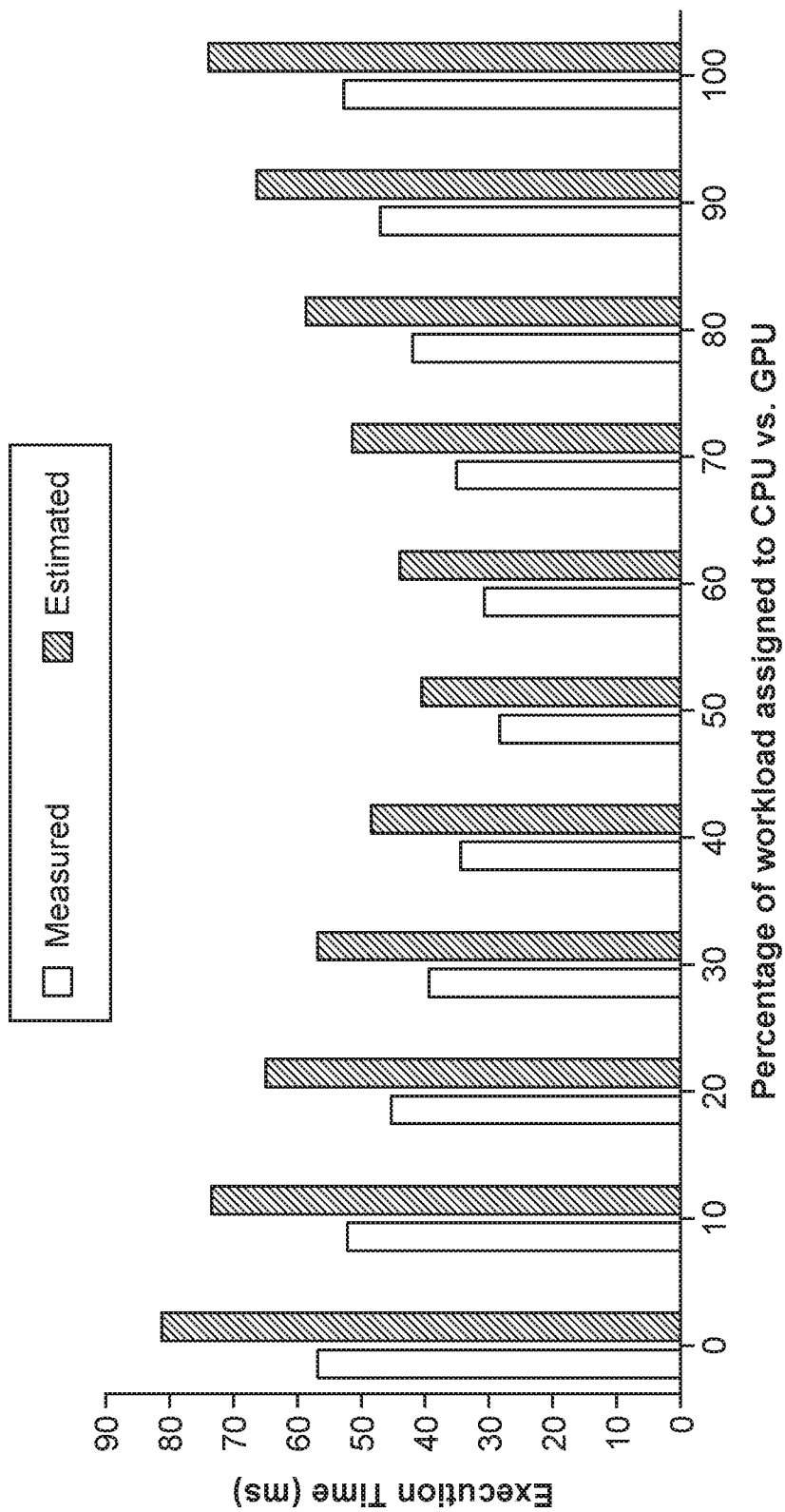
FIG. 4 illustrates measured and estimated data distribution ratio of CPU:GPU=50:50 for BlackScholes benchmark using embodiments of the invention, showing a measured performance improvement of 45.17% w.r.t. the fastest device.

The virtualizer 116 as disclosed in the embodiments was used to generate performance data on benchmarks for evaluation. A performance improvement of BlackScholes benchmark as a function the statically estimated workload/data distribution ratio between the CPU and GPU is illustrated in FIG. 4. As the results indicate, the optimal data distribution ratio between CPU and GPU of 50:50 shows measured performance improvement of 45.17% against the best performing device or target processing element.

The virtualizer 116 was further evaluated against benchmarks from the Nvidia SDK and Polybench suite and the results are shown in Table 1. It is seen from Table 1 that there is an average measured performance improvement of around 38.44% across all benchmarks. Therefore, the virtualizer 116 eliminates the time-consuming manual data distribution effort programmer among the CPU and GPU to yield performance improvement of the application.

TABLE 1

Estimated versus measured performance improvement using the systems and methods disclosed, w.r.t. the best performing device on different benchmarks

| Benchmark (%) | Estimated (%) | Measured (%) |
|---|---|---|
| BlackScholes | 44.79 | 45.17 |
| SYR2K | 67.18 | 62.05 |
| SYRK | 68.27 | 63.18 |
| ATAX | 9.69 | 12.43 |
| GESUMMV | 24.95 | 17.86 |

In other implementations, the execution time may be estimated by computing the best-case and worst-case execution times on both the target processing elements. Since memory latencies make a greater impact on the performance of an application, the best-case and worst-case estimations may be based on memory operations in the identified slowest path. The best-case scenario is when all the data is available in cache/shared memory. Worst-case scenario is when no data is available in cache and hence must be accessed from global/device memory. The relative estimated execution time gives the optimal data distribution ratio among the two devices for a given application.

The advantages of the above subject matter and its embodiments include providing an automatic and appropriate mapping of each kernel to the right target processing element. Therefore, the efficiency and performance of the system is increased. Moreover, the reduced time required for execution decreases the overall energy consumption.

Although the detailed description contains many specifics, these should not be construed as limiting the scope of the invention but merely as illustrating different examples and aspects of the invention. While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

What is claimed is:

1. A method for automatically optimizing task allocation in a heterogeneous computing system (HCS), the method comprising:
    receiving one or more requests from one or more applications for task allocation to a plurality of target processing elements;
    extracting parameters of kernels of the one or more, wherein the parameters comprise compute-to-communication ratio, parallelism, or synchronization;
    receiving information related to architectures of the plurality of target processing elements;
    determining predictions on execution time of the kernels in each of the plurality of target processing elements based on the parameters and the architectures;
    determining a workload distribution ratio among the plurality of target processing elements based on relative predicted execution time on each of the plurality of target processing elements;
    comparing the predictions to derive a mapping prediction, wherein the mapping prediction indicates a ranking of the plurality of target processing elements based on least execution time for each of the kernels and the workload distribution ratio;
    determining a target processing element based on the mapping prediction;
    compiling a target-specific source code of the portion of the one or more applications to machine code based on the determined target processing element; and
    allocating the task to the target processing element to provide optimized task allocation.

2. The method of claim 1, wherein the task comprises executing at least a portion of the one or more applications.

3. The method of claim 1, wherein the mapping prediction indicates ranking of the plurality of target processing elements and determines the workload distribution ratio.

4. The method of claim 1, further comprising: modifying the mapping prediction based on the executions of the portion of the one or more applications during runtime.

5. A system for automatically optimizing task allocation in Heterogeneous Computing Systems (HCS), the system comprising:
- a plurality of target processing elements;
- a host processor configured to:
- receive one or more requests from one or more applications for the task allocation; and
- execute a virtualizer for extracting parameters of kernels of the one or more applications and to receive information on the architectures of the plurality of target processing elements, wherein the parameters comprise compute-to-communication ratio, parallelism, or synchronization, and wherein the virtualizer comprises:
- a device conformability module to determine predictions on execution time of the kernels of the one or more applications for each of the architectures based on the parameters; and
- a mapping module configured to:
- determine a workload distribution ratio among the plurality of target processing elements based on relative predicted execution time on each of the plurality of target processing elements;
- compare the predictions to derive a mapping prediction, wherein the mapping prediction indicates a ranking of the plurality of target processing elements based on least execution time for each of the kernels and the workload distribution ratio;
- determine a target processing element based on the mapping prediction;
- a compiler configured to:
- compile a target-specific source code of the portion of the one or more applications to machine code based on the determined target processing element; and
- allocate the task to the combination of the plurality of target processing element to provide optimized task allocation.

6. The system of claim 5, wherein the mapping prediction indicates ranking of the plurality of target processing elements based on which a workload distribution ratio can be determined among the plurality of target processing elements.

7. The system of claim 5, wherein the plurality of target processing elements execute the portion of the one or more applications.

8. The system of claim 5, wherein the information on architectures include at least number of cores or threads, instructions executed per cycle, and frequency of operation, latency and power consumption.

9. The system of claim 5, wherein the plurality of target processing elements comprises at least one of Central Processing Unit (CPU), Graphics Processing Unit (GPU), Field Programmable Gated Array (FPGA).

10. The system of claim 5, wherein the plurality of target processing elements have distinct architectures.

11. A computer program product having non-volatile memory therein, carrying computer executable instructions stored therein for automatically optimizing task allocation in a heterogeneous computing system (HCS), the instructions comprising:
- receiving one or more requests from one or more applications for task allocation to a plurality of target processing elements;
- extracting parameters of kernels of the one or more applications, wherein the parameters comprise compute-to-communication ratio, parallelism, or synchronization;
- receiving information related to architectures of the plurality of target processing elements;
- determining predictions on execution time of the kernels in each of the plurality of target processing elements based on the parameters and the architectures;
- determining a workload distribution ratio among the plurality of target processing elements based on relative predicted execution time on each of the plurality of target processing elements;
- comparing the predictions to derive a mapping prediction, wherein the mapping prediction indicates a ranking of the plurality of target processing elements based on least execution time for each of the kernels and the workload distribution ratio;
- determining a target processing element based on the mapping prediction;
- compiling a target-specific source code of the portion of the one or more applications to machine code based on the determined target processing element; and
- allocating the task to the combination of the plurality of target processing element to provide optimized task allocation.

* * * * *